(12) United States Patent
Freeman (10) Patent No.: US 8,886,379 B2
(45) Date of Patent: Nov. 11, 2014

(54) THIN SAFE VEHICLE WHOSE SOLAR ARRAY CAN SUPPLY ITS POWER NEEDS

(71) Applicant: Benjamin David Freeman, Newtown Square, PA (US)

(72) Inventor: Benjamin David Freeman, Newtown Square, PA (US)

( * ) Notice: Subject to any disclaimer, the term of this patent is extended or adjusted under 35 U.S.C. 154(b) by 54 days.

(21) Appl. No.: 13/815,107

(22) Filed: Jan. 31, 2013

(65) Prior Publication Data

US 2014/0214249 A1 Jul. 31, 2014

(51) Int. Cl.
*G06F 17/00* (2006.01)
*G01C 21/34* (2006.01)
*B60L 8/00* (2006.01)

(52) U.S. Cl.
CPC .............. *B60L 8/003* (2013.01); *G01C 21/3469* (2013.01)
USPC .............. 701/22; 180/165; 180/302; 180/308; 180/422; 296/204

(58) Field of Classification Search
CPC ... B60L 11/002; B60L 11/1877; B60L 1/003; B60L 2220/44; Y02T 10/7005
USPC .................... 701/22; 180/165, 302, 308, 422; 296/204
See application file for complete search history.

(56) References Cited

U.S. PATENT DOCUMENTS

| 4,090,577 | A * | 5/1978 | Moore ........................... 180/243 |
| 8,317,257 | B2 * | 11/2012 | Rolfe et al. .............. 296/193.06 |
| 8,342,283 | B2 * | 1/2013 | Rolfe et al. ..................... 180/302 |
| 2010/0078245 | A1 * | 4/2010 | Rolfe et al. .................... 180/165 |
| 2010/0078253 | A1 * | 4/2010 | Rolfe et al. ..................... 180/302 |
| 2010/0078254 | A1 * | 4/2010 | Rolfe et al. ..................... 180/302 |
| 2011/0049992 | A1 * | 3/2011 | Sant'Anselmo et al. ....... 307/64 |
| 2014/0097030 | A1 * | 4/2014 | Rolfe et al. ...................... 180/55 |

* cited by examiner

*Primary Examiner* — McDieunel Marc (57) ABSTRACT

This device is an ultra-thin vehicle where no more than twenty five percent of its solar array extends beyond the vehicle when it is being driven and the solar array is undeployed. However, this same solar array will cover an area at least twice as large as the vehicle and approximately the same size as a parking space when the array is fully deployed. This solar array is also designed to make it possible to easily orient it towards the sun during the majority of time when it is parked. Hence, solar power can be the primary source of power for a typical driver due to the lowered power needs of this tapered ultra thin vehicle.

15 Claims, 8 Drawing Sheets

THIN SAFE VEHICLE WHOSE SOLAR ARRAY CAN SUPPLY ITS POWER NEEDS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The problem the present invention was created to solve is the range limitation of electric vehicles. As many corporate automobile engineers and an army of independent inventors and thinkers have realized, increasing the range of an electric car with a solar array could give electric cars the range they need to compete on an equal footing with gas driven cars. But no one has yet sold a solar car, truck or van commercially. I believe that this is because the following somewhat contradictory objectives must also be met to make a solar car as attractive to potential buyers as another type of vehicle:

A The total amount of electricity created by the solar array must be enough that it can provide most of the energy which an average driver uses. In general, this requires a solar array with a much larger average footprint than the footprint of the vehicle the solar panels are mounted on. However, the dimensions of the deployed solar array must not be so large that it goes beyond the area which is normally allotted for one cars usage.

B The solar array must not cause the vehicle to become unstable, to do a wheelie, to tip over or to take off like an airplane This requires that the area of the solar cells that extend beyond the perimeter of the vehicle be minimized when the vehicle is being driven.

C. the vehicle must be as intrinsically safe as a standard car, truck, bus or van of a similar type. This includes such factors as minimizing glare, making it possible for an average driver to turn the vehicle easily and not allowing solar panels to interfere with the drivers ability to see danger D. The solar array must not make it difficult for the driver and passengers to enter or leave the vehicle and it must not make it easy for solar cells to be vandalized or hit by stray road debris. The solar array must also not be positioned in such a way that passersby or others could easily get hurt or damage it by running into the solar panel. Additionally, the solar array must not make passengers feel claustrophobic by not allowing them to see out of the vehicle E. Over the lifetime of a typical car, truck, bus or van, the cost of the solar array and any mechanisms needed to support it must not be so expensive that they are significantly greater than the fuel savings created by switching to solar electricity from gasoline. Furthermore, the systems used must be reliable F. The solar array must be high enough when it is producing electricity that it will not be shaded by people, nearby vehicles and other objects of similar or lesser heights. It also must be designed in such a way that one part of the solar array does not shade another part for more than a small minority of the day.

G. The solar array must not interfere with the vehicles ability to perform as a standard car, minivan or similar vehicle in terms of parking, handling passenger comfort and other practical issues.

H. It must be possible to align or orient the solar array towards the sun for maximal electricity output.

While point A leads one to design a very large solar array, a very large array mounted high enough to allow for egress and to avoid other problems cited above would create stability problems while driving and interfere with fulfilling point B. But a large array whose parts that extended beyond the vehicle perimeter were mounted much lower would create egress problems, glare on the driver, be easily shaded by nearby objects including the roof array of the vehicle and be subject to vandalism. Just as driving and turning a large truck or bus is harder than driving a small car, any vehicle would be more difficult to drive if it had an array that extended significantly beyond its outside perimeter. Because it is easy to deal with things one can more easily see, solar panels extending beyond the rear of the vehicle would interfere with a drivers ability to handle the vehicle more than solar arrays extending beyond the area where the driver sits.

The key to understanding how to achieve the somewhat contradictory objectives A-H listed above is to have an array whose constituent parts (i.e., solar panels) do not extend significantly beyond the vehicles perimeter when it is being driven—but these solar panels can be repositioned when the vehicle is parked so that the total footprint of the solar array covers an area much larger than the vehicle. Since people typically park a vehicle far more than they drive it, an expandable solar array could increase the range of an electric car enough to fulfill an average driver's needs.

In the present invention, I use the word "undeployed" to describe the solar array when it's individual solar panels are in the positions they take when the vehicle is being driven. When the vehicle is parked, however, the solar array can be expanded to cover an area approximately equal to the size of a standard parking space. This repositioned solar array which covers a footprint larger than the vehicle is called "deployed" in the present invention.

With this in mind, let us examine the prior art to see what people have thought of in the past:

PRIOR ART

There are many patents, patent applications and actual uses of electric vehicles with solar cells providing some of the energy needed for the vehicle to operate. However, almost all of them involve putting solar panels on the roof, hood or other normally existing parts of a vehicle designed to look like typical vehicles on the road today. Another example of this would be Ward's U.S. Pat. No. 8,120,308 BC. While this patent has a variety of useful and interesting ideas, it specifically talks about solar panels "being mounted on the vehicle, or provided inside the vehicle beneath a mirror. Examples of surface where a solar panel can be provided include a roof, trunk, moon roof and a pick up truck bed cover. Other modular panels include solar panels provided on sunshades, roof rail attachments or roof top clamps on carriers." Like most other uses, patents and patent applications, it is clear that his invention only contemplates using a solar array of a fixed size and fixed location with its solar panels mounted on the available vehicle surface area. But as I mentioned in my "background" section, the limited area available on a vehicle makes a solar array limited in size to the roof, hood and other nearby areas too small to supply nearly enough electricity to provide most or all of the power required by a typical driver. It is well known, for instance, that Toyota has experimented with putting solar panels on some of its vehicles with electric motors. But its engineers have found that the extra range created does not justify the complexity and problems associated with adding a solar component to an electric or hybrid vehicle. Hence, the only solar vehicle they regularly sell is one with a small panel mounted on part of the roof and the only purpose of this solar panel is to help with heating and cooling of the vehicle.

There is a second group of vehicles and patent applications which have solar arrays that clearly extend beyond the perimeter of the area that would normally be included in a vehicle. In addition to the solar cars that race in the desert, I myself applied for a patent (Freeman 20100193261) which includes the idea of a solar array which always extends far beyond the perimeter of the vehicle. Not only is a stationary array as per either this or the last paragraph radically different from what is proposed in the present invention, but such vehicles have a variety of disadvantages as generally discussed in the background section.

On the other hand, there are only a handful of patents and actual uses of vehicles where the array covers a smaller footprint when it is undeployed and the vehicle is being driven as compared to the array covering a much larger area when it is deployed. Like another patent application that I am filing within a month of this one, the other patents and applications featuring a variable sized solar array are significantly different from this one in terms of how the solar panels move and how they are protected.

For instance, Glynn application (US 2012/0073885) also makes a general claim that solar panels should "move from a first position to a second position and from said second position to said first position." But if one examines his claims, specifications and drawings, it is obvious that he is only talking about solar panels which are always in a position facing upwards towards the sun. Like another patent by Ward (US 2008/0100258), Glynn's main thrust are solar panels that slide from one position to another one. While there are a variety of patents, uses and patent applications on moving solar arrays (including another abandoned application of mine "Freeman 20090288890" which envisions a solar array that is larger than the vehicle when undeployed but also does gets repositioned), none of these involve the same type of positioning and movement proposed in this patent application.

There are also many patents on solar carts (such as McGuire 20110146751, Withjack U.S. Pat. No. 4,452,234, Grayson U.S. Pat. No. 5,379,596, Geyer 20040094193, and Lin 20080053510). Niederer U.S. Pat. No. 7,888,590 includes the idea of a top solar panel with other solar panels hanging down vertically on hinges which could be raised to the same level as the topmost solar panel. But since the purpose of these inventions are to create a solar cart, none of them even consider the secondary issues which I listed in the objectives section.

It is also important to tilt the array towards the sun, especially in the early morning and just before the sun goes down. Proper positioning of a solar array which is close to horizontal at noon can make as much as a forty percent difference in electricity generation during the early morning and late afternoon hours. Many people have used formal two axis trackers or other complex systems to properly orient stationary solar arrays. But placing a two axis tracker or any of the other complex solar orientation devices used for stationary arrays on a moving vehicle is problematical. In fact, the complexities of integrating a formal two axis tracker system into a vehicle solar array is a major reason that I never filed a patent application on a vehicle system where a two axis tracker was required to orient the solar array to the sun. As I realized once I abandoned this effort, there is no need to use such a complex system in a moving vehicle. Instead, we can use the ability of the driver to pre-position a moving vehicle in the best possible direction when parking to simplify the system which one uses to orient the solar array of a moving vehicle. As you will see, the present invention creates the effect of a two axis tracker by combining the drivers' ability to easily reposition the vehicle with a simple one axis tilting system. In the searches that the patent agent who helped me and I made, we have never found anything else which uses the ability of a driver to pre-position a moving vehicle in the most advantageous direction as an integral part of a much simpler orientation system for a vehicle. Of course, the complex calculations required to do this properly while also deploying and retracting a solar array also requires the use of an onboard computer. Our deployable solar array could only be oriented, retracted and deployed by a scientist, an engineer or by someone who spent significant time learning how to do it and acclimating themselves to using the system if there were no onboard computer involved. But a regular driver would have no problems with this system as long as a properly programmed onboard computer took the lead. Not only have we found no prior art that uses the drivers ability to preposition the vehicle while parking as a key element in orienting a solar array, but we have found no prior art that uses an onboard computer to help the driver accomplish the complex computational oriented tasks required to orient a deployable solar array on a vehicle.

BRIEF SUMMARY OF THE PRESENT INVENTION

There will be a set of roof solar panels which covers an area almost as wide as the non-tapered part of the vehicle and runs the entire length of the cargo area and the adjacent couple of feet of the occupant area. It will be hinged at its front to the vehicle roof. In the prime embodiment, there will also be another moving far rear solar panel which covers about half of this solar panel and continues beyond the rear of the vehicle when undeployed. It will be attached to the same framework as this roof solar panel and will move backwards and swivel to a position totally behind all of the solar panels in the deployed position. The main set of roof solar panels would produce no electricity if it consisted of only one solar panel because part of it would be shaded by this moving far rear solar panel. Therefore, the main set of roof solar panels will include two solar panels so that one of them will never be shaded by the far rear solar panel. This one unshaded roof solar panel will produce electricity all the times. On the other hand, the second roof solar panel will only produce electricity when the array is deployed and the far rear solar panel is no longer covering it.

When the solar array is undeployed, the second and third set of solar panels of the claims (also called the side solar panels in the detailed description) will be hinged to both sides of this solar roof and hang down vertically. However, these side solar panels will not extend quite as far into the adjacent part of the occupant area as the roof solar panel. This is being suggested in the prime embodiment to avoid interfering with egress and to avoid interfering with the ability of the passengers to see. It also means that when the roof panel is raised to a tilted position by an actuator, this will have the effect of raising the side solar panels. To protect them from damage while driving and from vandalism, these side solar panels will be covered by what I call rear side walls. To deploy these side solar panels, the rear side walls will tilt outward to allow the side solar panels to rotate on their hinges to a position on the same level as the roof solar panels.

The occupants (including the driver) couldn't see well if we had side solar panels hanging down vertically in the occupant area near the front of the vehicle. Hence, the solar panel over the majority of the occupant area will be a stationary roof solar panel. So that the front half of the vehicle will capture something close to its share of the solar power needed to run the vehicle, this stationary solar panel will always extend beyond the perimeter of the vehicle. But to make it possible to turn corners and not cause the vehicle to be unstable, it won't extend nearly as far beyond the perimeter of the vehicle as the deployed side solar panels extend beyond the rear of the vehicle. And there will be another solar panel which will be tucked under the stationary solar panel in the undeployed position. This moving front solar panel (sixth set of one or more solar panels in the claims) will move forward to cover at least the hood area when the vehicle is parked and the array is fully deployed.

Not only will these last two solar panels cover the same area when the vehicle is being driven, but the only other solar panel that extends beyond the vehicle when it is being driven (the far rear solar panel) will only extend a few feet behind the vehicle and won't extend beyond the sides of the vehicle at all. Hence, the total footprint of the solar array that extends beyond the vehicle when it is being driven will be less than twenty percent of the footprint of the vehicle itself. Furthermore, it is best that the stationary front and moving front solar panels be tilted with their rears higher off the ground than their fronts. Since both of these solar panels are above the front half of the vehicle, this type of tilting will mean that they will actually decrease the danger of a front wheelie. Additionally, the use of an actuator and the hinging system of the rear group of solar panels will create a deployed result where all of the solar panels will be on the same plane whose overall tilt is the same from front to back. By parking the vehicle in a southerly direction and combining that with the use of jacks as outlined in the detailed description, this tilted solar array makes it possible to orient the solar array towards the sun for maximal power generation. Of course, one could also use a tiltable axle system or some other system to raise some of the wheels to create the de facto one axis tracker required to complement the drivers decision about how to park the car in order to create a proper orientation of the solar panels. Alternatively, one could use a one axis tracker to accomplish the same task. Because all of the mechanical parts needed to make this work are used thousands of times in other applications and none of them are especially complicated or prone to breakdown, the net result will be a reliable and reasonably priced vehicle.

With this in mind, I feel confident to say that the present invention fulfills objectives A-H far better than anything cited in the prior art or anything else I have seen in ten years of working on solar vehicles—with one exception that I myself have been working on during the last year. Unlike this other patent application I am filing within a few weeks, the prime embodiment of the present invention does have a slight overhang when the vehicle is being driven. Another slight problem with the present invention is that the fully deployed solar array would not be exactly equal to what I see as the optimal rectangular shape and size of a typical parking space. To make up for these minor imperfections, the best way to make a vehicle primarily powered by solar power as outlined in the present invention (i.e., the prime embodiment portrayed in the drawings and outlined in the detailed description) would also include the following features:

The front wheels would be separated much more than the distance between the two sides of the occupant area. The stability this would create offsets any stability problems created by the slight solar panel overhang cited two and three paragraphs ago. Because of various factors relating to the way that the side solar panels could open, I suggest that this be vehicle be very thin. It also should be tapered so that only a very comfortable driver seat can fit in the front row. But since the taper will allow the vehicle to get wider as one moves away from the front, one could put a bench thirty five inches wide in the second row so that two people could sit there. Especially if the driver was the largest person in the car and also considering that three person travelling groups almost always include one small woman or a child, the two thinnest people of the three could sit together comfortably on that back bench. Hence, almost any group of three people could travel together in this very thin vehicle. Since ninety five percent of trips involve three or less people, this vehicle could be used almost ninety five percent of the time. Not only is the eliminated seat often called the "death seat" because it is the most dangerous of the traditional four or five seats in a vehicle, but the extra wide front axle would allow the front wheels to cushion the blow of a side impact collision. Hence, this vehicle would be safer than a vehicle which is not so light and thin. As an ultra-thin vehicle with an aerodynamic front taper, it would weigh far less and be more intrinsicially sleeker by reducing the aerodynamic drag. Therefore, the slightly smaller amount of energy created by the fact that the size of the deployed solar array may be less wide than a parking space in the front would be offset by the lowered power needs of an ultrathin vehicle.

The rising price of gas has caused many corporate research and development departments and independent inventors and tinkerers to work on a solar car without any of them addressing even half of the objectives or problems outlined above. The fact that no one else, including myself in many attempts before the last year, has come up with a vehicle which achieves more than a small percentage of the somewhat conflicting objectives required for a practical solar car suggests that it is not obvious how one could create the results that the present invention achieves.

Since there is nothing new under the sun, the present invention obviously incorporates ideas and features which have been used and proposed in other contexts including impractical solar vehicles. Nonetheless, the inability of myriad engineers and others with knowledge of the art to come up with a practical solar car means that the way I have combined different features ideas is clearly not obvious to someone with a knowledge of the art and, furthermore, the present invention also creates an unexpected result as contemplated in the patent law.

Before we move on to the sections involving the drawings, detailed description and the claims, it is necessary and useful for me to define a few words and put them in context for purposes of their use in this patent application.

In the present invention, I use the term structure to apply to a large framework that connects the first, second, third and, possibly, fourth set of solar panels as per the claims (these same sets of solar panels are sometimes called the roof, side and far rear solar panels in the drawings and detailed description). At its front perimeter, this structure could be attached by a group of two or more hinges to the vehicle roof. Whether the structure is directly connected to the roof, connected to the stationary solar panel which itself is connected to the roof or both of them share a connection, the bottom line is that the front edge of the structure will be fixedly attached in a certain position that will not change between the undeployed and deployed positions. Most likely this attachment will be a set of two hinges. The drawings and detailed description also suggest that an actuator raise the roof solar panel. Since the roof solar panels are connected to the structure and, through the structure, to the side solar panels and the far rear solar panels as well, the actuator moving the set of first solar panels (generally two roof solar panels) will also have the effect of raising the side solar panels, the structure and the far rear solar panel as well. Not only are the first, second, third and, if they exist, fourth set of solar panels connected to each other through their common connection to this structure, but some forms of movement would involve all of these sets of solar panels together. Therefore, I use the term "rear solar array" to refer collectively to all of these first, second, third and, if they are included on the vehicle, fourth sets of solar panels. But I also use the term "solar array" (without the word rear attached) to describe all of the solar panels collectively including those in the front.

While all four of these sets of solar panels (first, second, third and fourth solar panel or panels) in the rear solar array may move together in one particular circumstance, some of them will move differently in other circumstances. However, each of the solar panels in the same set of solar panels will always move together from the deployed to the undeployed position. Hence, I call a group of solar panels which move together and in the same way a "set" of solar panels. However, the only time that the difference between a solar panel and a set of solar panels is relevant in the one embodiment shown in the drawings and discussed in the detailed description involves the set of roof solar panels mounted on the rear of the vehicle (set one in claims and numbered 402 and 403 in the drawings).

In both the common usage and my usage of the teen in the present invention, a solar panel refers to a group of solar cells that are held together by one substrate and within one framework. It is also true that there is an internal wiring among the solar cells in a particular solar panel which means that shading as little as eight percent (or, at most half) of the solar panel has the effect of causing it to be unable to produce any significant amounts of usable electricity.

It is with this electrical wiring in mind that you can see the main reason that one would use two different solar panels to cover one group of solar cells which move together from the undeployed to the deployed position. The reason that the detailed description only divides one group of solar panels that move together into two specific solar panels (402 and 403) is that the rear one (403) is covered by solar panel 107 in the undeployed position. If the area covered by solar panels 402 and 403 were wired as one (in which case they would be numbered only 402 in the drawings), then this entire area of solar cells would produce no electricity in the undeployed position—despite the fact that the front half of the area is not shaded. Only by dividing this area into two solar panels (i.e, 402 and 403) can we allow the front half (402) to produce electricity. In every other case, the detailed description uses a singular term "solar panel" as identical to the terms "sets of solar panels" because this embodiment only uses one solar panel to move from one undeployed position to another deployed position. Since the detailed description is pointing only to one specific embodiment, there is no reason to call one solar panel a 'set' of solar panels when I already know that this set only consists of one solar panel. But because the claims are talking about any embodiment of the present invention rather than just the one embodiment of the drawings, the claims generally call the solar cells which cover an area which moves together from the deployed to the undeployed position a "set" of solar panels. And in the one case where the prime embodiment includes two solar panels, there is no reason to make the description more complex by calling it a set with two members. I simply give each of the two members a number (402 and 403) and refer to each of them as individual solar panels. But, in fact, the claims and the drawings are both intended to make it clear that there might be more than one solar panel moving in the same direction from the undeployed to the deployed position and vice versa.

It is also important to remember that the type of solar cell can vary. Monocrystalline silicon, polycrystalline silicon, amorphous silicon, cadmium telluride, copper indium sulfide can all be used. Many currently available solar cells of these types are made from bulk materials that are cut into wafers between 180 to 240 micrometers thick that are then processed like other semiconductors. But a promising new avenue is called thin film. Other types of organic dyes and polymers deposited on various supporting substrates have also been employed to convert solar energy into electricity. Nano-crystals and quantum dots (which are usually electron-confined nonoparticles) have also been employed to create solar generated electricity. What defines something as a solar cell is that it can convert sunlight into electricity. Since the key to the present invention involves movement of groups of solar cells together from one position to another one, any type of solar cell can be used as long as they can be placed on some sort of substrate or within some sort of framework which can be moved around from one position to another one. Just as the type of solar cell can vary, the substrate on which they are placed can vary as well.

For purposes of this invention, the word actuator is used to describe any mechanism which moves in one line in one direction. However, the fact that some solar panels and the structure are hinged in addition to being connected with an actuator means that the movement of an actuator might change the tilt of a solar panel, set of solar panels or the rear solar array rather than simply moving it in the same type of "up or down" or "forwards and backwards" direction in which the actuator and panel would move if the set of solar panel(s) was not fixedly attached to something else.

In addition to actuators that move in a straight line, the present invention also uses a mechanism which rotates itself and the solar panel to which it is attached. Unlike both this "rotating mechanism" and the actuators which move on their own because of electrical, hydraulic, pneumatic or other forms of power, there is also a telescoping track associated with the sixth solar panel or panels. This is a commonly used mechanism which could be configured as a set of plates which are stacked up in the undeployed position. When the solar panel they are attached to in the front of the vehicle is moved forward by an actuator, the forward movement of the solar panel will have the effect of moving one and then another of these formerly stacked up plates forwards to help support the newly deployed sixth solar panel or panels (also called the "moving front solar panel" numbered 108 in the drawings and detailed description). The reason that the prime embodiment uses both an actuator and a telescoping slide to help the moving front solar panel reposition itself is that this makes it more stable.

LIST OF DRAWING REFERENCE NUMBERS 101 tires and wheels
102 the sun
103 moving tray framework for supporting far rear solar section
104 framework for all solar panels behind the occupants compartment
105 fifth set of solar panels
107 fourth set of solar panels
108 sixth set of solar panels
109 horizontal actuator associated with sixth set of solar panels
110 moving telescoping track
112 hood vertical actuators
113 fenders
114 jacks
115 moving side walls
116 Hinges
117 stationary parts of rear side walls
118 support for front and rear solar panels
119 windows and windshield
120 rotating actuator
121 right side rear solar panel(s)
122 sliding tray and mechanism
200 on board computer
201 solar charge controller
202 circuits
203 electric port
204 batteries
205 internal wiring
206 electric motor
302 front seat
303 rear bench
304 axles
306 steering wheel
307 actuators to tilt side walls
308 actuators to raise and tilt side solar panels
309 housing for actuators associated with roof and side rear solar panels
310 door
311 left side rear solar panel(s)
312 actuator to first set of solar panels
402 rear roof solar panel
403 front roof solar panel
501 vehicle

MORE DETAILED DESCRIPTION OF THE PRESENT INVENTION REFERENCING THE DRAWINGS

Figure 1:
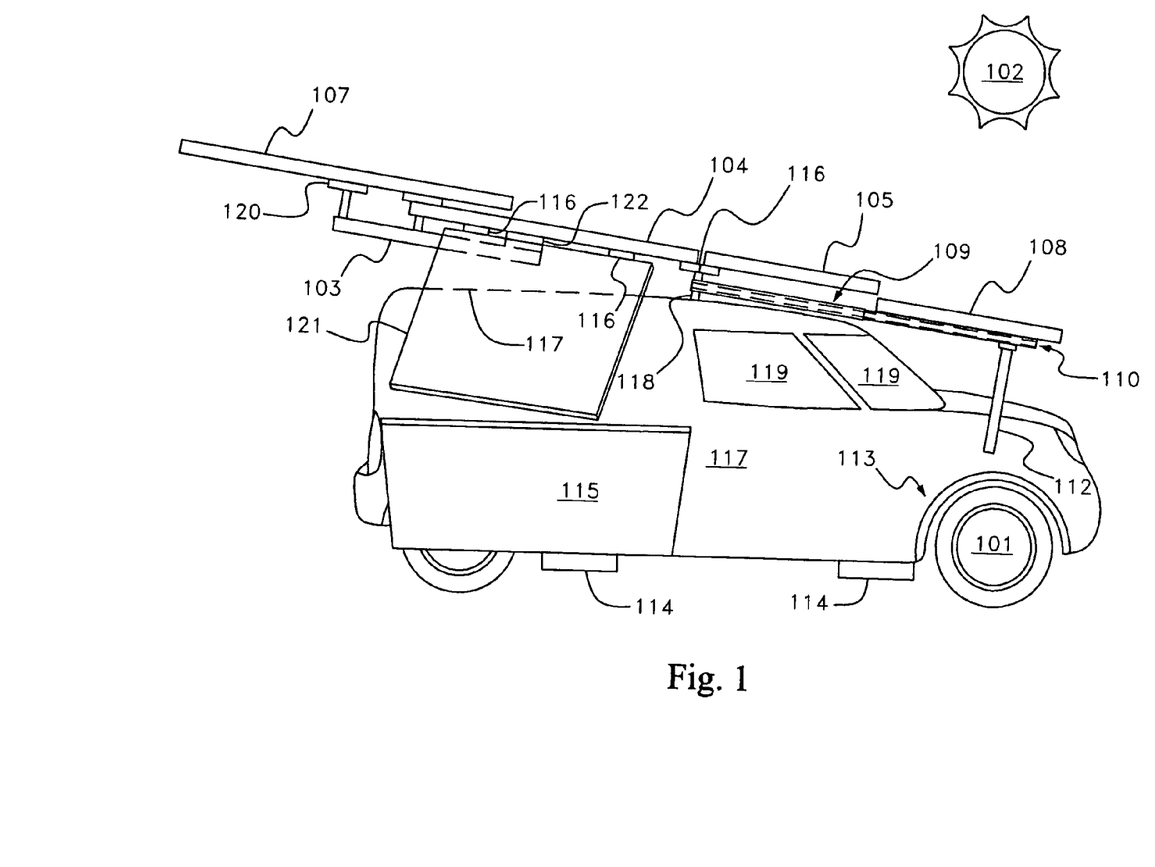
FIG. 1 Is a side view of the present invention when the vehicle is driving and the solar array is being deployed.
Figure 2:
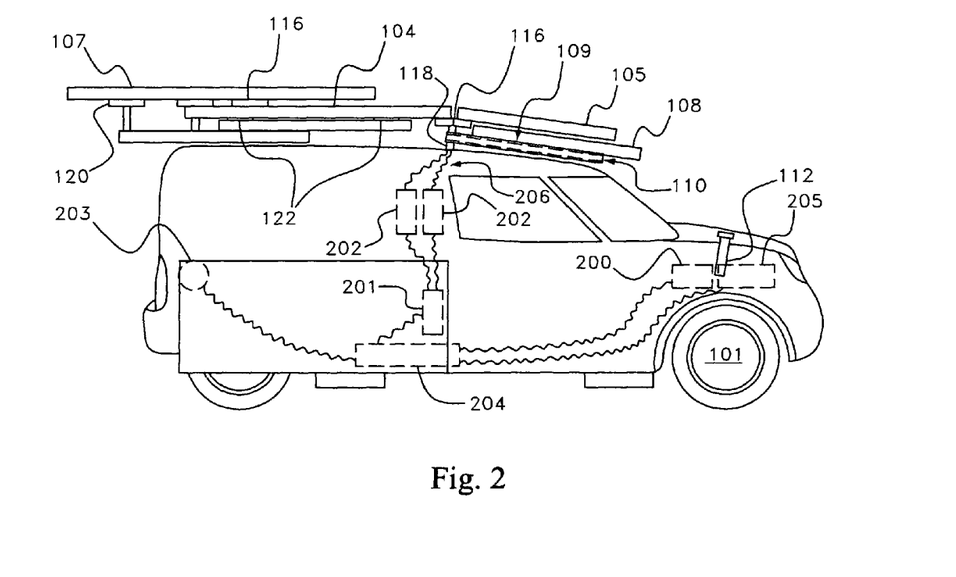
FIG. 2: Is a side view of the present invention when the vehicle is driving and the solar array is not deployed.

A key movement which one can best visualize by comparing the position of the moving solar panel 108 from its undeployed position in figure two to its deployed position in figure one is that this solar panel 108 moves forward from being under the stationary solar panel 105 in figure two to being in front of it in figure one. Because the front edge of the solar panel 108 is attached to the front edge of horizontal actuator 109, the inner tube of this horizontal actuator 109 moving outward causes solar panel 108 to move outwards as well. Because the front of the telescoping track 110 is attached to the front of solar panel 108, the movement of solar panel 108 causes the telescoping track 110 to also move. I suggest two items (the telescoping track 110 and the horizontal actuator 109) to maintain the solar panel's stability because otherwise it would be too easy for the solar panel 108 to shake on a windy day. To help support this extended solar panel from below, this embodiment of the present invention suggests that a hood vertical actuator 112 come up from with the hood and help hold the solar panel 108 up when it is deployed forwards of its undeployed position.

In a similar vein, we can see that a much larger percentage of far rear solar panel 107 is behind the structure 105 in its partly deployed position in figure one than the percentage of this same solar panel 107 which is behind the same structure 104 in its undeployed position in figure two. This occurs because of solar panel 107's attachment to rotary actuator 120 which, in turn is attached to a sliding tray 103 and the mechanism which moves it 122. As the mechanism 122 moves backwards under structure 104 (which it is attached to), this mechanism 122 moves the sliding tray 103, the rotating actuator 120 and the solar panel 107 which are all attached.

Technically, FIG. 104 is the structure which connects and holds in place the various solar panels which make up the solar array consisting of the first four sets of solar panels mentioned in the claims. But since the roof solar panels (402 and 403) are directly behind this structure 104, it is useful to remember that FIG. 104 moves in exactly the same way as the roof solar panels 402 and 403 behind it. With this in mind, we can see the tilting movement of the structure 104 as being identical to the tilting movement of the first set of solar panels 402 and 403. We can see this tilt when we compare figure two (where only solar panels 105 and 108 are tilted) to figure one (where the structure 104 and solar panel 107 are also tilted on the same plane. The tilt is caused by the structure 104 being attached to a hinge 116 as the solar panels totally within that structure (402 and 403) are pushed upwards by actuator 312. Since this structure is also attached to solar panels 121, 311 and 107, all three of these solar panels also move upwards due to the movement of actuator 312.

Figure 3:
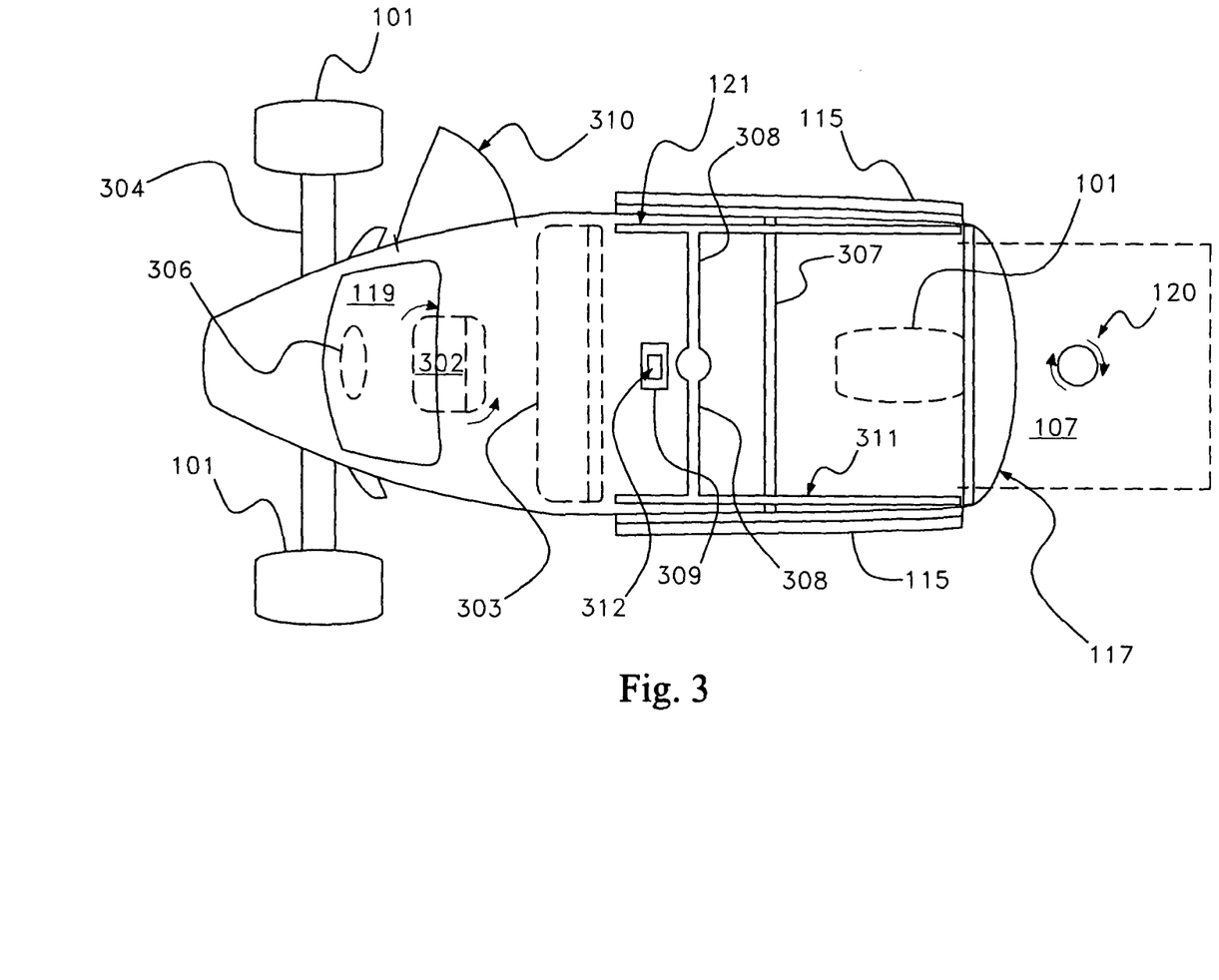
FIG. 3 is a top view of the present invention with the solar array (except for far rear solar area behind the vehicle) and the roof taken off FIG. 4 Is a depiction of how the part of the rear side walls that tilt will allow the side solar panels to tilt and rotate to a position on the same level as the roof solar panels. The rear wall and solar panel 107 are not shown
Figure 4:
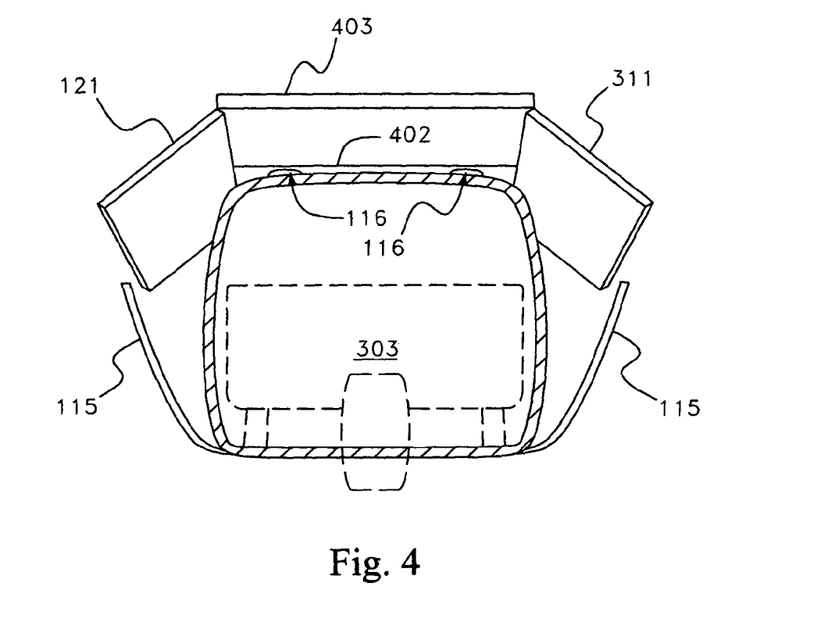
Figure 5:
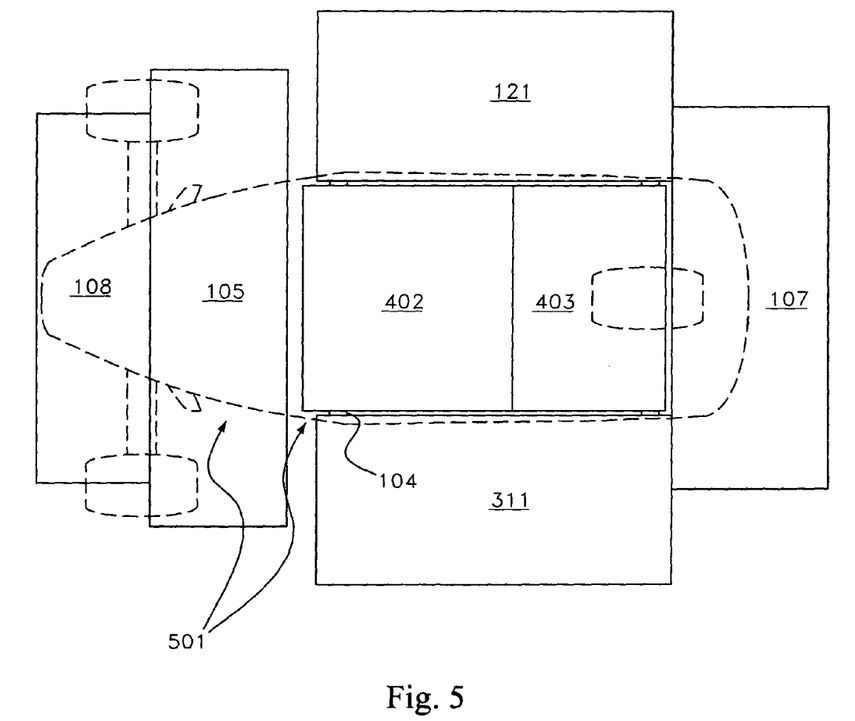
FIG. 5: Is a top view of the present invention when the solar array is fully deployed.

If one looks at the second set of solar panels 121 in figure two and both the second and third set of solar panels (121 and 311) in figure four, we can see how they begin to rotate on their hinges towards a position on the same level as first set of solar panels 402 and 403. To keep the total length of the solar array shorter while still maximizing the area of solar cells exposed to direct sunlight, these sets of solar panels 121 and 311 will rotate to a position that is perpendicular to the sides of the vehicle and on the same level as the first set of solar panels 402 and 403. The actuators 308 that move these sets of solar panels 121 and 311 and cause them to rotate are shown in figure three.

After solar panels 107 and its rotating mechanism 120 move backwards as described earlier, the rotating actuator 120 swivels or rotates solar panel 107 ninety degrees to a position which is perpendicular to its undeployed position.

If one looks at the directional arrow next to fourth set of solar panels in figure three, one can imagine how the rotating device 120 swivels the fourth set of solar panels 107 to a position where its long sides are perpendicular to the long sides of the vehicle and perpendicular to the long sides of the first set of solar panels 402 and 403. By comparing the position of this fourth set of solar panels 107 in figures one, two and three to the position of this same fourth set of solar panels in figure five, we can also see how the rotating mechanism 120 swivels the fourth set of solar panels 107 ninety degrees. In the fully deployed position as depicted in figure five, all six sets of solar panels are on the same level and none of them cover over any other set of solar panels.

Figure 6:
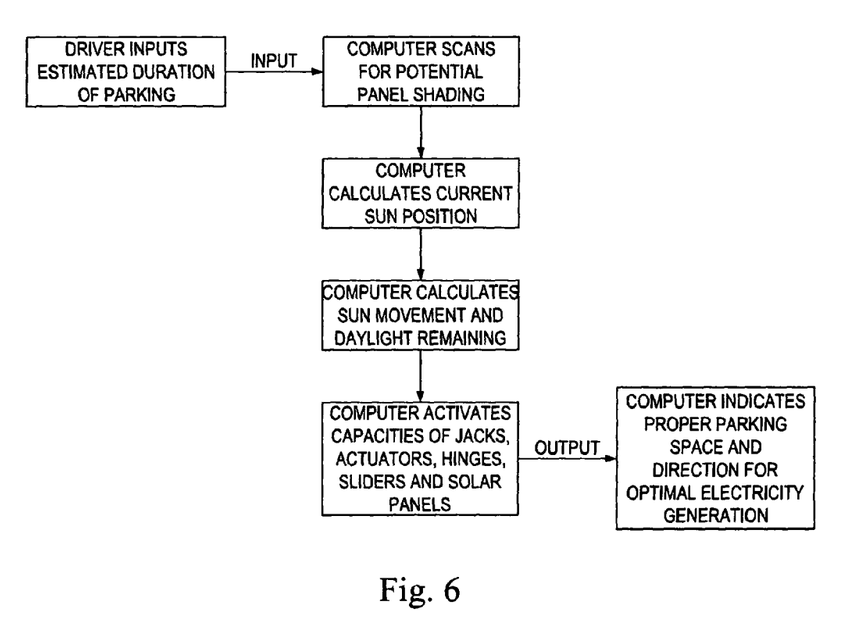
FIG. 6: is a representation of how the onboard computer will help orient the solar array towards maximal electricity generation

Once all the solar panels are on the same plane and this plane is tilted where the back part is higher than the front part; it is necessary to park the vehicle in a generally south facing direction. Partly because it is difficult to know where true south lies, partly because one usually one has a few parking directional choices and partly because the sun moves across the sky, the vehicle includes strong internal jacks 114. These can be used to raise one or more corners of the vehicle to fine-tune the positioning of the solar array to maximize solar power generation. In parking appropriately, one must also consider large objects and how they might shade the solar array over time. It is also to park the vehicle in a direction where the tilted solar array will generally face south. Due to the complexity associated with this process, figure six illustrates how an onboard computer can take the lead role in this process.

Figure 7:
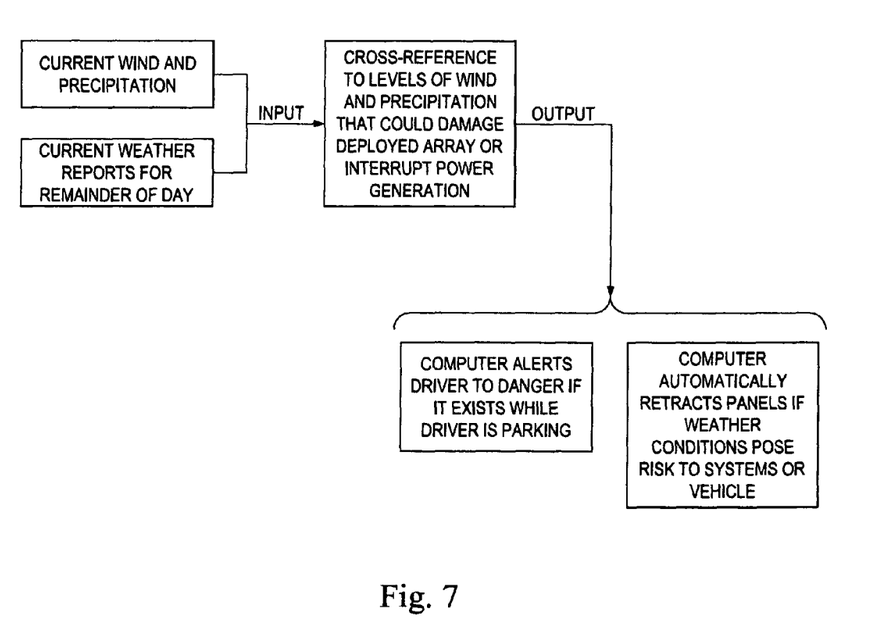
FIG. 7 is a representation of how the onboard computer will help driver protect the solar panels from extreme weather

There is also a danger that heavy winds, very heavy precipitation or some combination of the two might create a high probability that solar panels might be damaged if they are left in the more vulnerable deployed position. Hence, figure seven illustrates the considerations which an onboard computer would make to retract the array or suggest that the array never be deployed if extreme weather conditions existed.

Figure 8:
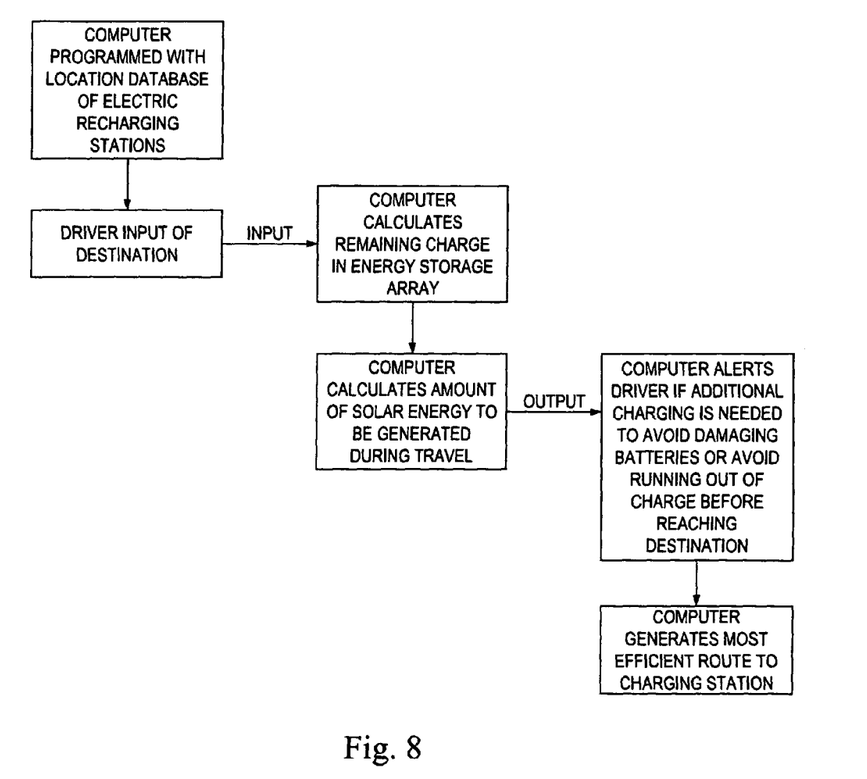
FIG. 8: is a representation of how the onboard computer will help driver maintain proper battery charge

Another important point is that almost all electric vehicles (including the type contemplated in the present invention) require a partly charged battery array 204 (or other energy storage systems) to operate at all. Furthermore, depleting the energy storage system below a certain level (generally sixty percent) begins to cause long-term damage. The same can be true with overcharged battery arrays 204—albeit to a lesser extent. As figure eight suggests, therefore, the onboard computer could have access to a GPS type system and a programmed knowledge of the location of all nearby electric recharging stations. With this in mind, the onboard computer will be able to suggest to the driver when it might be advisable to make a detour to recharge the batteries. If the driver agrees, then the onboard computer would plot the most efficient course to a battery recharging station and thence to the final destination determined by the driver.

The wavy line(s) in figure two represents the direction of travel of electricity within the vehicle. Firstly, solar generated electricity will come down into the vehicle at a point just below the support for front and rear solar panels 118. This is the most appropriate entrance point for the solar generated electricity because all the solar panels are indirectly connected to, and approximately equidistant from, this support point. The electricity from the solar panels that generate electricity even when the array is undeployed (105, 107 and 403) will go to one of the two circuits 202 while the solar generated electricity from the other solar panels (311, 121, 402 and 108) will go to the other circuit. From there all the solar electricity will go to the solar charge controller 201. Once the solar charge controller 201 has properly regulated the voltage of the electricity so it won't damage the batteries 204, it will be sent to the battery array 204. When the motor 205 needs it, electricity will then be sent for its use. The onboard computer 200 will also get its electricity from the battery array 204. When the vehicle is producing more electricity than it needs, excess electricity can go through the electrical port 203 to a compatible electrical port in a nearby structure. Alternatively, if the vehicle needs more electricity than the solar panels can generate, electricity can flow from an outside source through electrical port 203 to the batteries 204.

Although the terms and definitions used in the specification are intended to be read into the claims they are not intended to limit the meets and bounds of the claims presented here below in any manner whatsoever.

I claim:

1. A solar vehicle with extended driving range, wherein; the solar vehicle has a steering system, a braking system, seats, lights, an instrumentation system, one or more energy storage systems, an electrical prime mover for propulsion, at least three wheels and an occupant and cargo compartment wherein the cargo area is located to the rear of the occupant area;

at least one rear solar array; comprising at least one or more first sets of solar panels which cover at least eighty percent of the cargo area roof and whose solar cells are always facing upwards; this rear solar array will also include one or more second sets of solar panels and one or more third sets of solar panels; when not deployed the one or more second sets of solar panels will hang down from one side of the vehicle and the one or more third sets of solar panels will hang down from the other side of the vehicle; when not deployed the solar cells of both the second and third set of solar panels will face outwards and be at least partly covered by some physical object which does not have solar cells facing outwards;

the three or more sets of solar panels comprising the one rear solar array are linked together by a structure which is attached within two feet of its front edge to the roof of the vehicle;

when deployed, the second and third set of solar panels will have their solar cells facing upwards and they will be located within five degrees of being on the same plane as the first set of solar panels.

2. The solar vehicle of claim 1, wherein: there will also be a set of one or more fourth solar panels which are attached to the structure of claim 1: when undeployed, at least forty percent of the total footprint of this set of one or more fourth solar panels will be overlapping the footprint of both the roof of the vehicle and the total footprint of the set of one or more first sets of solar panels; when deployed, all of this fourth set of solar panels will be behind all of the other solar panels.

3. The vehicle of claim 2, wherein: one set of one or more fifth solar panels are located in a fixed position above the occupant area and with their solar cells facing upwards: the total width of this one or more fifth solar panels will be at least twenty percent wider than the width of the vehicle.

4. The vehicle of claim 3, wherein: when un-deployed one or more sixth solar panels are movably attached and at least partly covered by one or more of the set of one or more fifth solar panels.

5. The vehicle of claim 4, wherein: when deployed, the one or more sixth solar panels are moved forwards to a position where they are fully exposed to noon sunlight on a clear day.

6. The vehicle of claim 5 wherein: the electrical voltage required by the prime mover to operate will be no more than the total voltage of all of the solar panels combined.

7. The vehicle of claim 6, wherein: one of more coupling devices are for input of electricity from an alternative source of electric power or for output of electricity from the solar vehicle to an alternative electrical load.

8. The vehicle of claim 7, wherein: the two front wheels are separated by a distance that is at least 130 percent of the width of the occupant and cargo compartment.

9. The vehicle of claim 8, wherein: two or more jacks or hydraulic lifts raise at least a part of the solar vehicle for orienting to the sun or for vehicle repair or maintenance.

10. The vehicle of claim 9, wherein: the entire rear solar array can be tilted and moved so that all of the solar panels are on the same plane in the deployed position and that plane is tilted with respect to the ground.

11. The vehicle of claim 10, wherein: the bottom of the one or more energy storage devise is no more than five inches above the floor of the occupant and cargo compartment.

12. The vehicle of claim 11, wherein: a first indicator displays a measurement of the amount of usable energy stored in the one or more energy storage systems; A second indicator displays a measurement of the amount of solar energy being converted into electricity by all the solar panels mounted on the vehicle; A third indicator displays the current direction of the sun or due south.

13. The vehicle of claim 12, wherein: there are fenders over at least two of the three or more wheels.

14. The vehicle of claim 13, wherein: a computer can perform both of the following operations:
  i) determining whether the vehicle can make a trip suggested by the driver without running out of electricity or creating a danger of long term damage to the energy storage system(s),
  ii) if the computer determines that the driver's proposed trip could cause long-term damage to the energy storage system(s) or if the vehicle will run out of electricity on the way, the computer will suggest the shortest detour whereby it is possible to stop at a battery charging station.

15. The solar vehicle of claim 14, wherein: a computer can monitor weather reports and use some source of direct knowledge of wind and precipitation to:
  i) tell the driver if there is enough danger of damaging the solar array to make it inadvisable to deploy it when parking
  ii) to retract the solar array if the computer determines that the danger of damaging the solar array has increase to the point that it is.

\* \* \* \* \*